United States Patent
Goh et al.

(10) Patent No.: US 9,040,015 B2
(45) Date of Patent: May 26, 2015

(54) POST-TREATMENT METHOD OF CARBON MATERIALS FOR IMPROVING THE ELECTRICAL CONDUCTIVITY AND MECHANICAL PROPERTIES VIA DEHYDROCYCLIZATION REACTION AND POLYMER COMPOSITE MATERIALS COMPRISING THE TREATED CARBON MATERIALS

(71) Applicant: KOREA INSTITUTE OF SCIENCE AND TECHNOLOGY, Seoul (KR)

(72) Inventors: Munju Goh, Jeollabuk-do (KR);
Ok-kyung Park, Jeollanam-do (KR);
Yong Mun Choi, Jeollabuk-do (KR);
Bon-Cheol Ku, Jeollabuk-do (KR);
Joong Hee Lee, Jeollabuk-do (KR);
Nam Ho You, Daejeon (KR); Han Sol You, Jeollabuk-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 127 days.

(21) Appl. No.: 13/796,214

(22) Filed: Mar. 12, 2013

(65) Prior Publication Data
US 2014/0191165 A1 Jul. 10, 2014

(30) Foreign Application Priority Data
Jan. 8, 2013 (KR) ........................ 10-2013-0002212

(51) Int. Cl.
*C01B 31/02* (2006.01)
*C01B 31/04* (2006.01)
*H01B 1/04* (2006.01)

(52) U.S. Cl.
CPC ......... *C01B 31/0484* (2013.01); *C01B 31/0253* (2013.01); *H01B 1/04* (2013.01)

(58) Field of Classification Search
CPC .............. C01B 31/0253; C01B 31/026; C01B 31/0484; C01B 31/0492; C01B 31/083
USPC ................ 423/445 B, 447.1, 447.3, 448, 460
See application file for complete search history.

(56) References Cited

FOREIGN PATENT DOCUMENTS

| CN | 102757035 A | 10/2012 |
|---|---|---|
| KR | 1990-012676 A | 9/1990 |
| KR | 1991-700215 A | 3/1991 |

OTHER PUBLICATIONS

Lopez, Vicente, et al. "Chemical Vapor Deposition Repair of Graphene Oxide: A Route to Highly Conductive Graphene Monolayers." Advanced Materials 21.EPFL-ARTICLE-159080 (2009): 4683-+.*

(Continued)

*Primary Examiner* — Richard M Rump
(74) *Attorney, Agent, or Firm* — Ladas & Parry LLP

(57) ABSTRACT

Provided are a method for post-treatment of a carbonaceous material using dehydrocyclization, a carbonaceous material post-treated by the method, and a polymer composite material including the carbonaceous material. More particularly, provided are a method for post-treatment of a carbonaceous material using dehydrocyclization, including subjecting the carbonaceous material to dehydrocyclization at room temperature to heal structural defects in the carbonaceous material, while increasing the effective conjugated length of the carbonaceous material to improve the electrical conductivity thereof, as well as a carbonaceous material post-treated by the method and a polymer composite material including the carbonaceous material.

6 Claims, 2 Drawing Sheets

(56) References Cited

OTHER PUBLICATIONS

Choi, Yong-Mun, et al. "Chemical Method for Improving Both the Electrical Conductivity and Mechanical Properties of Carbon Nanotube Yarn via Intramolecular Cross-Dehydrogenative Coupling." ACS applied materials & interfaces 5.16 (2013): 7726-7730.*

Villar-Rodil, Silvia, et al. "Preparation of graphene dispersions and graphene-polymer composites in organic media." Journal of Materials Chemistry 19.22 (2009): 3591-3593.*

Sundaram, Ravi Shankar. Electrical Properties of Chemically Derived Graphene. Diss. École Polytechnique Fédérale De Lausanne, 2011.*

Hye Young Koo, et al; "Gold nanoparticle-doped graphene nanosheets: sub-nanosized gold clusters nucleate and grow at the nitrogen-induced defects on graphene surfaces", Journal of Materials Chemistry, vol. 22, Issue 15, pp. 7130-7135, First published on the web Feb. 17, 2012.

Lukas Dössel, et al; "Graphene Nanoribbons by Chemists: Nanometer-Sized, Soluble, and Defect-Free", Angewandte Chemie International Edition, vol. 50, Issue 11, pp. 2540-2543, Article first published online: Jan. 12, 2011.

Wojciech Pisula, et al; "Exceptionally Long-Range Self-Assembly of Hexa-peri-hexabenzocoronene with Dove-Tailed Alkyl Substituents", Journal of the American Chemical Society, vol. 126, Issue 26, pp. 8074-8075, Publication Date (Web): Jun. 4, 2004.

Wei Gao, et al; "New insights into the structure and reduction of graphite oxide", Nature Chemistry, Advance Online Publication, Published online: Jul. 5, 2009; pp. 1-6.

* cited by examiner

POST-TREATMENT METHOD OF CARBON MATERIALS FOR IMPROVING THE ELECTRICAL CONDUCTIVITY AND MECHANICAL PROPERTIES VIA DEHYDROCYCLIZATION REACTION AND POLYMER COMPOSITE MATERIALS COMPRISING THE TREATED CARBON MATERIALS

CROSS-REFERENCE TO RELATED APPLICATION

This application claims priority to Korean Patent Application No. 10-2013-0002212, filed on Jan. 8, 2013, and all the benefits accruing therefrom under 35 U.S.C. §119, the contents of which in its entirety are herein incorporated by reference.

BACKGROUND

1. Field

The present disclosure relates to a method for post-treatment of a carbonaceous material using dehydrocyclization, a carbonaceous material post-treated by the method, and a polymer composite material including the treated carbonaceous material. More particularly, the present disclosure relates to a method for post-treatment of a carbonaceous material using dehydrocyclization, the method including subjecting the carbonaceous material to dehydrocyclization at room temperature to heal structural defects in the carbonaceous material obtained by a conventional method, while increasing the effective conjugated length of the carbonaceous material to improve the electrical conductivity thereof. The present disclosure also relates to a carbonaceous material post-treated by the method, and a polymer composite material including the treated carbonaceous material.

2. Description of the Related Art

Carbonaceous materials of nanomaterials have been used widely in various industrial fields by virtue of their excellent physical and chemical properties. Particularly, carbonaceous materials such as graphene, graphite, carbon nanotubes and fullerene have been spotlighted as materials for electric/electronic devices, optical devices and filter devices.

Graphene is one of the carbon allotrope materials including a sheet of carbon atoms formed by strong chemical covalent bonding between one carbon atom and another. Three electrons of the four valence electrons of a carbon atom forming graphene make $sp^2$ bonding and form a strong covalent bond, i.e., sigma ($\sigma$) bond, while the remaining one electron not forming the bond makes $\pi$ bonding with another carbon atom adjacent thereto. In this manner, the material itself forms a $\pi$-conjugated structure as a two-dimensional body having a hexagonal honeycomb lattice structure. Thus, graphene shows high electrical conductivity.

Recently, it has been most spotlighted to apply such excellent electrical conductivity of graphene to electric/electronic industries, or to production of highly conductive polymeric films including a polymeric resin filled with graphene as a conductive filler.

Graphene has an electron transportability approximately up to 15000 $cm^2/V_s$ at room temperature under ambient pressure, and in principle, shows a high electrical conductivity of $8 \times 10^5$ S/cm. However, in fact, graphene has a lower electrical conductivity than the calculated value.

Graphene is produced in the top-down approach and bottom-up approach. Production of graphene through the bottom-up approach is based on self-assembly of carbon atoms, and thus provides graphene having low defects. Therefore, the bottom-up approach is advantageous in that it provides high-quality graphene. However, production of graphene through the bottom-up approach is not amenable to mass production, and thus is limited in industrial applicability.

Mass production of graphene is essential to apply graphene to various industrial fields. To satisfy this, the top-down approach has been given many attentions. The top-down approach is based on separation or exfoliation of a graphite material by a chemical or physical process to obtain graphene or surface-modified graphene. The top-down approach is amenable to mass production and shows high cost efficiency, and thus has high industrial applicability. However, due to the chemical or physical treatment process, graphene obtained by the top-down approach has many defects, thereby providing a significant drop in electrical conductivity.

For example, when graphene is produced by oxidizing the surface of graphene chemically to increase the interlayer distance and to decrease the Van der Waals force between graphene sheets, and by applying force larger than the Van der Waals force thereto to perform exfoliation, it is required to remove the insulating oxygen functional groups formed on the surface in order to improve the electrical conductivity.

In general, hydrazine is frequently used to reduce graphene oxide. In this case, surface defects are formed while the surface functional groups are removed, and thus the resultant graphene shows low electrical conductivity so that it may not be used as a conductive filler.

Therefore, in order to apply such chemically oxidized/reduced graphene to various industrial fields, it is required that the surface defects formed during the reaction are decreased effectively to improve the electrical conductivity.

In addition, the same problems as mentioned above may be applied to the electrical conductivity and mechanical properties of carbon nanotube fibers. Since carbon nanotubes have excellent mechanical properties and electrical conductivity like graphene, they have been given many attentions in terms of their industrial applicability.

Currently, the most important industrial field, into which research and development of carbon nanotubes are conducted, is producing high-strength fibers including carbon nanotubes exclusively by agglomerating carbon nanotubes in the form of fibers. Since carbon nanotube fibers are those including carbon nanotubes exclusively, they have low specific gravity and are light, show excellent mechanical properties as well as high electrical conductivity. Thus, carbon nanotubes are materials to which many attentions are given in terms of their industrial applicability. However, like graphene, carbon nanotube fibers also have the problem of surface defects causing degradation of physical properties thereof.

Therefore, there has been a continuous need for developing a method for improving the electrical conductivity and mechanical strength of the resultant carbon nanotube fibers at the same time so that high-functional high-quality carbon nanotubes may be provided.

REFERENCES OF THE RELATED ART

Patent Document (Patent Document 1) Chinese Laid-Open Patent Publication No. 102757035

Non-patent Document (Non-patent Document 1) J. Am. Chem. Soc., 2004, 126, 8074, K. Mullen et al.

(Non-patent Document 2) Angew, Chem, Int. Ed, 2011, 50, 2540, K. Mullen et al.

SUMMARY

The present disclosure is directed to providing a method for post-treatment of a carbonaceous material using dehydrocyclization, the method including: introducing a dehydrogenation-inducing material to a carbonaceous material after production to carry out dehydrocyclization and to form aryl-aryl cross-coupling bonds, thereby healing the surface defects of the carbonaceous material and supplementing the π-conjugated structure to improve the electrical conductivity and mechanical strength of the carbonaceous material. The present disclosure is also directed to providing a carbonaceous material post-treated by the method, and a polymer composite material including the same.

In one aspect, there is provided a method for post-treatment of a carbonaceous material using dehydrocyclization, the method including: reducing an oxidized carbonaceous material; adding a dehydrocyclization-inducing catalyst to the reduced carbonaceous material; and carrying out dehydrogenation on the surface of the carbonaceous material by the dehydrocyclization-inducing catalyst, while forming aryl-aryl bonds in the surface of the carbonaceous material.

According to an embodiment, the oxidized carbonaceous material may be reduced by heat treatment or chemical treatment.

According to another embodiment, the oxidized carbonaceous material may be graphene oxide or oxidized carbon nanotube fibers.

According to still another embodiment, the dehydrocyclization-inducing catalyst may be at least one selected from the metal group consisting of ferric chloride ($FeCl_3$), copper, palladium and rhodium.

In another aspect, there is provided a method for post-treatment of graphene using dehydrocyclization, the method including: reducing graphene oxide; adding ferric chloride ($FeCl_3$) as a catalyst to the reduced graphene; and carrying out dehydrogenation on the surface of graphene by ferric chloride ($FeCl_3$) as a catalyst, while forming aryl-aryl bonds in the surface of graphene.

In still another aspect, there is provided a method for post-treatment of carbon nanotube fibers using dehydrocyclization, the method including: reducing oxidized carbon nanotube fibers; adding ferric chloride ($FeCl_3$) as a catalyst to the reduced carbon nanotube fibers; and carrying out dehydrogenation on the surface of carbon nanotube fibers by ferric chloride ($FeCl_3$) as a catalyst, while forming aryl-aryl bonds in the surface of carbon nanotube fibers.

In still another aspect, there is provided a carbonaceous material post-treated by any one of the above-mentioned methods.

In still another aspect, there is provided graphene or carbon nanotube fibers post-treated by the above-mentioned methods.

In yet another aspect, there is provided a polymer composite material including the carbonaceous material, graphene or carbon nanotube fibers subjected to the post-treatment as mentioned above.

The carbonaceous material and polymer composite material disclosed herein show significantly improved electrical conductivity and mechanical properties.

In addition, according to the method for post-treatment of a carbonaceous material using dehydrocyclization, post-treatment is carried out by a chemical process. Thus, it is possible to carry out mass production of carbonaceous materials and polymer composite materials having significantly improved electrical conductivity and mechanical properties.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
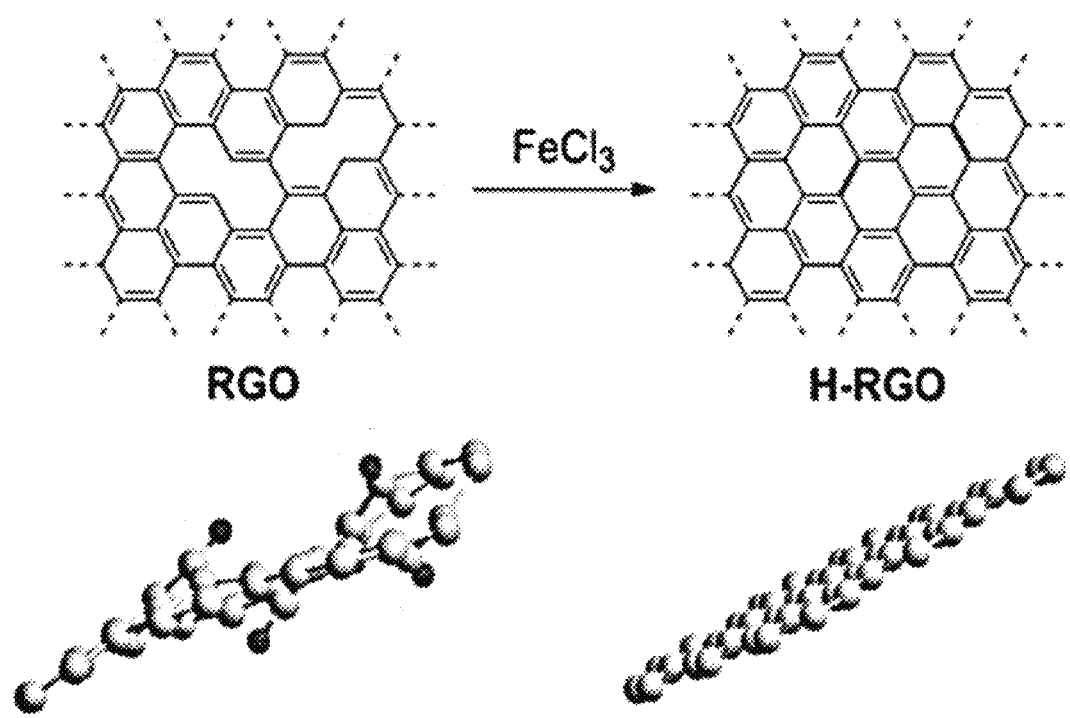
FIG. 1 is a schematic view illustrating the reaction of post-treatment of a carbonaceous material using dehydrocyclization according to an embodiment.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein.

As used herein, it is to be understood that the term 'GO' means graphene oxide, 'RGO' means graphene oxide reduced with hydrazine ($NH_2NH_2$). In addition, the term 'H-RGO (24 h)' used herein means graphene subjected to post-treatment for 24 hours after reduction, and the number in parenthesis varies with the post-treatment time after reduction.

Further, the term 'H-CNTF (6 h)' means carbon nanotube fibers subjected to post-treatment for 6 hours, and the number in parenthesis varies with the post-treatment after reduction.

As mentioned above, there is provided a method for post-treatment of a carbonaceous material using dehydrocyclization, the method using dehydrocyclization to perform post-treatment of a carbonaceous material to heal the surface defects of the carbonaceous material, while improving the electrical conductivity and mechanical properties significantly. There are also provided a carbonaceous material post-treated by the method and a polymer composite material including the material.

In one aspect, the method for post-treatment of a carbonaceous material using dehydrocyclization includes: reducing an oxidized carbonaceous material; adding a dehydrocyclization-inducing catalyst to the reduced carbonaceous material; and carrying out dehydrogenation on the surface of the carbonaceous material by the dehydrocyclization-inducing catalyst, while forming aryl-aryl bonds in the surface of the carbonaceous material.

There is no particular limitation in the oxidized carbonaceous material. For example, the oxidized carbonaceous material may be reduced by heat treatment or chemical treatment. Reduction with heat treatment includes reducing the oxidized carbonaceous material by applying heat thereto at 700° C. or higher. In addition, reduction with chemical treatment includes reducing a carbonaceous material using a reductant.

There is no particular limitation in the oxidized carbonaceous material, as long as it includes carbon as its ingredient. For example, the oxidized carbonaceous material means at least one of graphene, carbon nanotubes, carbon nanotube fibers, graphite and fullerene in its oxidized form. Particularly, graphene oxide or oxidized carbon nanotube fibers may be used as the oxidized carbonaceous material.

Next, a dehydrocyclization-inducing catalyst is added to the carbonaceous material reduced in the preceding operation.

Herein, the dehydrocyclization-inducing catalyst to be added is not particularly limited, as long as it induces dehydrocyclization. Particularly, the catalyst may be at least one selected from the metal group consisting of ferric chloride ($FeCl_3$), copper, palladium and rhodium. As compared to the treatment of defects of a carbonaceous material including doping the carbonaceous material with a noble metal according to the related art, use of the dehydrocyclization-inducing catalyst disclosed herein provides improved cost efficiency and is advantageous in terms of mass production.

For example, when using ferric chloride ($FeCl_3$) as a dehydrocyclization-inducing catalyst, ferric chloride is dissolved into nitromethane to form a solution, which, in turn, may be added to the carbonaceous material, particularly in a drop-to-drop mode.

After adding the dehydrocyclization catalyst, dehydrogenation occurs on the surface of the carbonaceous material, while aryl-aryl bonds are formed in the surface of the carbonaceous material. In this manner, the carbonaceous material is post-treated by dehydrocyclization (see FIG. 1).

The reaction may be carried out at room temperature (5-40° C.). Thus, unlike the related art requiring additional heating to heal the surface defects of a carbonaceous material, the method disclosed herein avoids a need for additional heating, thereby providing improved energy efficiency.

The carbonaceous material is stabilized through the post-treatment. For example, when inducing dehydrocyclization in graphene by adding ferric chloride ($FeCl_3$) thereto, aryl-aryl bonds are formed at the sites of surface defects of graphene to facilitate formation of a π-conjugated structure on the graphene surface, resulting in significant improvement in electrical conductivity (see FIG. 1).

After subjecting graphene, carbon nanotube fibers and carbonaceous materials to the post-treatment using dehydrocyclization as disclosed herein, the surface defects of such carbonaceous materials are healed while providing significantly improved electrical conductivity and mechanical properties. In addition, a polymer composition material including any one of the above-mentioned graphene, carbon nanotube fibers and carbonaceous materials shows significantly improved electrical conductivity and mechanical properties, and thus may be used widely in various industrial fields, including optical devices, filter devices or film devices in addition to electric/electronic devices.

The examples and experiments will now be described. The following examples and experiments are for illustrative purposes only and not intended to limit the scope of the present disclosure.

EXAMPLE

Production of Oxidized Graphene Using Hummer's Method

First, 1 g of graphite (~350 mesh) and 50 mL of sulfuric acid (98%) are mixed with each other at room temperature to provide a mixed solution and 6 g of potassium permanganate is added gradually thereto. After completing the addition of oxidant, the mixture is heated to 45° C. for 12 hours to perform a reaction, and then the reaction container is cooled to room temperature. To the reaction container cooled to room temperature, 80 mL of distilled water is added gradually. When the reaction mixture is cooled to room temperature under agitation, 200 mL of distilled water is further added thereto, and 6 mL of hydrogen peroxide (35 wt % aqueous solution) is added dropwise thereto until the reaction mixture turns into a yellow color, After the resultant yellow-colored graphene oxide dispersion is further agitated for 30 minutes and determined to be cooled to room temperature, the reaction mixture is introduced to a tube for centrifugal separation. Then, centrifugal separation is carried out at 5000 rpm for 1 hour to precipitate graphene oxide. After the centrifugal separation, the supernatant is discarded, 60 mL of tertiary distilled water is further added, and ultrasonication is carried out for 10 minutes to form uniform dispersion. Additionally, centrifugal separation is carried out at 5000 rpm for 1 hour. The above-described procedure is repeated three times to remove an excessive amount of acid. Then, graphene oxide slurry is introduced to a dialysis tube (Spectrumlab, Mw cut-off: 6,000-9,000) and neutralized to pH 7. The neutralized graphene oxide slurry is subjected to freeze drying at −45° C. for 2 days, and then further dried at 50° C. for 1 day to obtain graphene oxide.

Example 1

Post-treatment of Graphene Using Dehydrocyclization

After adding 0.2 g of RGO reduced with hydrazine to 100 mL of dichloromethane, the reaction container is sealed and purged with nitrogen gas for 30 minutes. After purging with nitrogen, solution of $FeCl_3$ dissolved in nitromethane is added dropwise (drop-by-drop) to the reaction container, and the reaction mixture is purged with nitrogen for 2 hours under agitation at room temperature. After the completion of purging, the reaction container is sealed to carry out a reaction for 24 hours. Then, 100 mL of methanol is added thereto to quench the reaction. In addition, 200 mL of methanol is further added thereto and agitation is carried out for 24 hours to remove the remaining reaction materials, followed by filtering and drying in a vacuum oven at 60° C. In this manner, defect-healed graphene (H-RGO (24 h)) is obtained.

Example 2

Post-treatment of Graphene Using Dehydrocyclization

After adding 0.2 g of RGO reduced with hydrazine to 100 mL of dichloromethane, the reaction container is sealed and purged with nitrogen gas for 30 minutes. After purging with nitrogen, solution of $FeCl_3$ dissolved in nitromethane is added dropwise (drop-by-drop) to the reaction container, and the reaction mixture is purged with nitrogen for 2 hours under agitation at room temperature. After the completion of purging, the reaction container is sealed to carry out a reaction for 48 hours. Then, 100 mL of methanol is added thereto to quench the reaction. In addition, 200 mL of methanol is further added thereto and agitation is carried out for 24 hours to remove the remaining reaction materials, followed by filtering and drying in a vacuum oven at 60° C. In this manner, defect-healed graphene (H-RGO (48 h)) is obtained.

Example 3

Post-treatment of Graphene Using Dehydrocyclization

After adding 0.2 g of RGO reduced with hydrazine to 100 mL of dichloromethane, the reaction container is sealed and purged with nitrogen gas for 30 minutes. After purging with nitrogen, solution of $FeCl_3$ dissolved in nitromethane is added dropwise (drop-by-drop) to the reaction container, and the reaction mixture is purged with nitrogen for 2 hours under agitation at room temperature. After the completion of purging, the reaction container is sealed to carry out a reaction for 72 hours. Then, 100 mL of methanol is added thereto to quench the reaction. In addition, 200 mL of methanol is further added thereto and agitation is carried out for 24 hours to remove the remaining reaction materials, followed by filtering and drying in a vacuum oven at 60° C. In this manner, defect-healed graphene (H-RGO (72 h)) is obtained.

Comparative Example 1

Graphene Subjected No Post-treatment Using Dehydrocyclization

After dispersing 0.2 g of GO into 100 mL of distilled water (deionized water) by ultrasonic waves for 30 minutes, a graphene dispersion is added to the reaction container and the reaction container is set to a temperature of 100° C. When the reaction container reaches 100° C., 0.5 g of hydrazine is added to the reaction container and agitation is carried out at 100° C. for 1 hour. After completing the agitation, the reaction mixture is cooled to room temperature, filtered and dried in a vacuum oven at 60° C. to obtain reduced graphene (referred to also as RGO hereinafter).

Example 4

Post-treatment of Carbon Nanotube Fibers Using Dehydrocyclization

After winding carbon nanotube fibers around a glass rod and placing them in a reaction container, the reaction container is sealed and purged with nitrogen gas for 30 minutes. After purging with nitrogen, solution of $FeCl_3$ dissolved in nitromethane is added dropwise (drop-by-drop) to the reaction container, and the reaction mixture is purged with nitrogen for 2 hours under agitation at room temperature. After the completion of purging, the reaction container is sealed to carry out a reaction for 6 hours. Then, 100 mL of methanol is added thereto to quench the reaction. In addition, 200 mL of methanol is further added thereto and agitation is carried out for 24 hours to remove the remaining reaction materials, followed by filtering and drying in a vacuum oven at 60° C. In this manner, defect-healed carbon nanotube fibers (H-CNTF (6 h)) are obtained.

Example 5

Post-treatment of Carbon Nanotube Fibers Using Dehydrocyclization

After winding carbon nanotube fibers around a glass rod and placing them in a reaction container, the reaction container is sealed and purged with nitrogen gas for 30 minutes. After purging with nitrogen, solution of $FeCl_3$ dissolved in nitromethane is added dropwise (drop-by-drop) to the reaction container, and the reaction mixture is purged with nitrogen for 2 hours under agitation at room temperature. After the completion of purging, the reaction container is sealed to carry out a reaction for 12 hours. Then, 100 mL of methanol is added thereto to quench the reaction. In addition, 200 mL of methanol is further added thereto and agitation is carried out for 24 hours to remove the remaining reaction materials, followed by filtering and drying in a vacuum oven at 60° C. In this manner, defect-healed carbon nanotube fibers (H-CNTF (12 h)) are obtained.

Example 6

Post-treatment of Carbon Nanotube Fibers Using Dehydrocyclization

After winding carbon nanotube fibers around a glass rod and placing them in a reaction container, the reaction container is sealed and purged with nitrogen gas for 30 minutes. After purging with nitrogen, solution of $FeCl_3$ dissolved in nitromethane is added dropwise (drop-by-drop) to the reaction container, and the reaction mixture is purged with nitrogen for 2 hours under agitation at room temperature. After the completion of purging, the reaction container is sealed to carry out a reaction for 24 hours. Then, 100 mL of methanol is added thereto to quench the reaction. In addition, 200 mL of methanol is further added thereto and agitation is carried out for 24 hours to remove the remaining reaction materials, followed by filtering and drying in a vacuum oven at 60° C. In this manner, defect-healed carbon nanotube fibers (H-CNTF (24 h)) are obtained.

Comparative Example 2

Carbon Nanotube Fibers Subjected No Post-treatment Using Dehydrocyclization

First, ethanol or acetone as a source of carbon that is a main ingredient of carbon nanotubes, 0.1-2.5 wt % of ferrocene functioning as a catalyst with which carbon nanotubes are grown, and 0.05-5 wt % of thiophene functioning as an activator are mixed. Then, the resultant mixture is treated with ultrasonic waves to obtain a solution, which, in turn, is introduced to a vertical type electric furnace at 1,130-1,250° C. at a rate of 5-25 mL/h. In addition, hydrogen gas used as a carrier gas for the reaction materials is introduced thereto at a rate of 800-1600 sccm to perform synthesis of carbon nanotubes in the electric furnace. The carbon nanotubes are passed through the water bath positioned below the electric furnace, treated with dimethyl sulfoxide (DMSO) and passed through a drying machine at a temperature of 200° C. to obtain carbon nanotube fibers (also referred to as CNTF hereinafter).

Test Example 1

Figure 2:
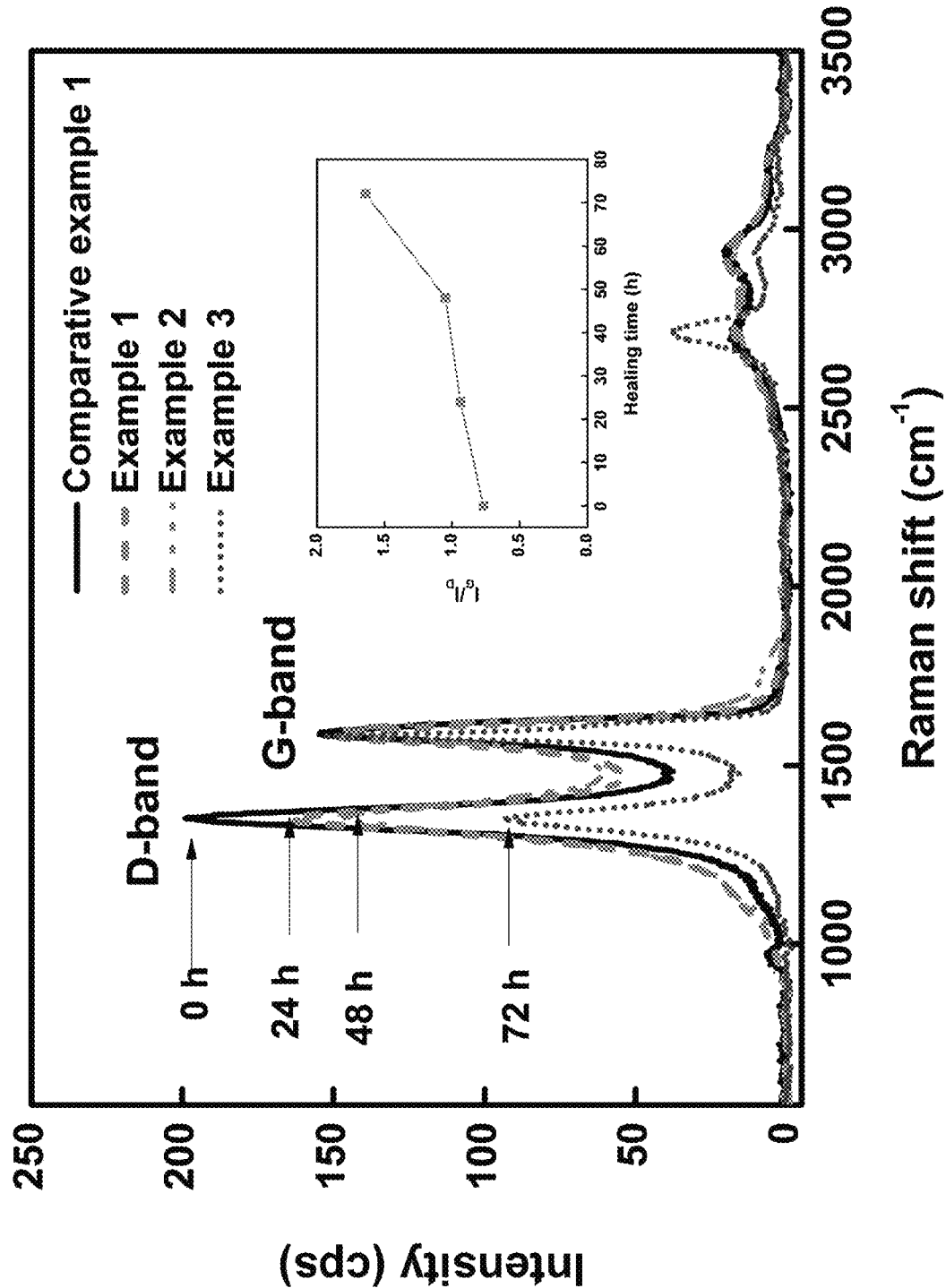
FIG. 2 is a graph showing the Raman shift and variations in $I_G/I_D$ ratio of Examples 1, 2 and 3 and Comparative Example 1.

To determine whether the post-treatment disclosed herein supplements the defects of a carbonaceous material by forming aryl-aryl cross-coupling bonds or not, and how post-treatment time affects healing of the defects of a carbonaceous material, Raman spectra of Examples 1-3 and Comparative Example 1 using graphene are obtained and intensity ratios ($I_G/I_D$) between G-band and D-band are calculated. The results are shown in the following Table 1, and the Raman spectra and $I_G/I_D$ curves are shown in FIG. 2.

TABLE 1

Variations in $I_G/I_D$ of Reduced Graphene Depending on Healing Time

| | Sample | $I_G/I_D$ ratio |
|---|---|---|
| Example 1 | H-RGO(24 h) | 0.93 |
| Example 2 | H-RGO(48 h) | 1.04 |
| Example 3 | H-RGO(72 h) | 1.64 |
| Comparative Example 1 | RGO | 0.77 |

As can be seen from Table 1 and FIG. 2, the post-treatment of reduced graphene using intermolecular cross-dehydrogenative coupling disclosed herein provides an increased $I_G/I_D$ ratio, as compared to graphene reduced with hydrazine (0.77→1.64). This demonstrates that the post-treatment carried out at room temperature as disclosed herein effectively supplements the defect portions formed on the basal-plane of graphene through aryl-aryl cross-coupling bonds, and thus increases crystallinity.

Test Example 2

To determine whether the post-treatment method disclosed herein effectively improves the electrical conductivity or not, the electrical conductivity of each of Examples 1-3 and Comparative Example 1 using graphene is measured, and the results are shown in the following Table 2.

TABLE 2

Variations in Electrical conductivity Depending on Post-treatment Time

| | Sample | Electrical conductivity (S/m) |
|---|---|---|
| Example 1 | H-RGO(24 h) | 4,270 |
| Example 2 | H-RGO(48 h) | 5,050 |
| Example 3 | H-RGO(72 h) | 7,180 |
| Comparative Example 1 | RGO | 620 |

As can be seen from Table 2, graphene reduced with hydrazine according to Comparative Example 1 provides an electrical conductivity of about 620 S/m. On the contrary, when defects of graphene are healed by using the intermolecular cross-dehydrogenative coupling disclosed herein, graphene provides higher electrical conductivity as post-treatment time increases. Particularly, Example 3 in which the reaction is carried out for 72 hours provides an electrical conductivity of about 7,180 S/m, which is 10 times higher than the electrical conductivity of Comparative Example 1.

Referring to the results of Test Example 1, it can be seen that the post-treatment method disclosed herein supplements defects of graphene effectively at room temperature, and thus provides graphene with significantly improved electrical conductivity.

Test Example 3

TABLE 3

| | Sample | $I_G/I_D$ ratio |
|---|---|---|
| Example 4 | H-CNTF(6 h) | 3.25 |
| Example 5 | H-CNTF(12 h) | 4.20 |
| Example 6 | H-CNTF(24 h) | 4.46 |
| Comparative Example 2 | CNTF | 2.25 |

As can be seen from Table 3, the post-treatment of carbon nanotube fibers carried out for 24 hours by using intermolecular cross-dehydrogenative coupling disclosed herein provides a significantly increased $I_G/I_D$ ratio, as compared to Comparative Example 2 (2,25→4.46). This demonstrates that the post-treatment carried out at room temperature as disclosed herein effectively reduces the defect portions through aryl-aryl cross-coupling, and thus increases crystallinity of carbon nanotube fibers.

Test Example 4

TABLE 4

Variations in Electrical conductivity of Carbon Nanotube Fibers Depending on Post-treatment Time

| | Sample | Electrical conductivity (S/m) |
|---|---|---|
| Example 4 | H-CNTF(6 h) | 290,000 |
| Example 5 | H-CNTF(12 h) | 355,000 |
| Example 6 | H-CNTF(24 h) | 324,000 |
| Comparative Example 2 | CNTF | 189,000 |

As can be seen from Table 4, when defects of carbon nanotube fibers are healed by using the intermolecular cross-dehydrogenative coupling disclosed herein, carbon nanotube fibers provide higher electrical conductivity as post-treatment time increases. Particularly, Example 5 in which the reaction of post-treatment is carried out for 12 hours provides an electrical conductivity that is approximately twice of the electrical conductivity of Comparative Example 2 (189,000 S/m→355,000 S/m). Referring to the results of Test Example 3, it can be seen that the post-treatment method disclosed herein supplements defects of carbon nanotubes effectively at room temperature, and thus provides carbon nanotubes with significantly improved electrical conductivity.

Test Example 5

TABLE 5

| | Sample | Tensile strength (MPA) |
|---|---|---|
| Example 4 | H-CNTF(6 h) | 260 ± 14 |
| Example 5 | H-CNTF(12 h) | 392 ± 92 |
| Example 6 | H-CNTF(24 h) | 369 ± 40 |
| Comparative Example 2 | CNTF | 235 ± 62 |

As can be seen from Table 5, when defects of carbon nanotube fibers are healed by using the intermolecular cross-dehydrogenative coupling disclosed herein, carbon nanotube fibers provide higher tensile strength as post-treatment time increases. Particularly, Example 5 in which the reaction of post-treatment is carried out for 12 hours provides a tensile strength improved by about 50% based on Comparative Example 2 (235 MPa→392 MPa). Referring to the results of Test Example 3, it can be seen that the post-treatment method disclosed herein effectively supplements defect portions causing degradation of mechanical properties at room temperature, and thus provides carbon nanotubes with significantly improved tensile strength.

While the exemplary embodiments have been shown and described, it will be understood by those skilled in the art that various changes in form and details may be made thereto without departing from the spirit and scope of the present disclosure as defined by the appended claims.

What is claimed is:

1. A method for post-treatment of a carbonaceous material using dehydrocyclization, the method comprising the steps of:
   reducing an oxidized carbonaceous material;
   adding a dehydrocyclization-inducing catalyst selected from the group consisting of ferric chloride, copper, palladium, rhodium and combinations thereof to the reduced carbonaceous material; and carrying out dehydrogenation on the surface of the carbonaceous material by the dehydrocyclization-inducing catalyst, while forming aryl-aryl bonds in the surface of the carbonaceous material.

2. The method for post-treatment of a carbonaceous material using dehydrocyclization according to claim 1, wherein the oxidized carbonaceous material is reduced by heat treatment or chemical treatment in said reducing.

3. The method for post-treatment of a carbonaceous material using dehydrocyclization according to claim 1, wherein the oxidized carbonaceous material is graphene oxide or oxidized carbon nanotube fibers.

4. A carbonaceous material post-treated by the method as defined in claim 1.

5. A polymer composite material comprising the carbonaceous material as defined in claim 4.

6. A method for post-treatment of a carbonaceous material using dehydrocyclization, the method comprising the steps of:
 reducing an oxidized carbonaceous material;
 adding a ferric chloride dehydrocyclization-inducing catalyst to the reduced carbonaceous material; and
 carrying out dehydrogenation on the surface of the carbonaceous material by the dehydrocyclization-inducing catalyst, while forming aryl-aryl bonds in the surface of the carbonaceous material.

\* \* \* \* \*